United States Patent

Heth

[15] 3,635,044
[45] Jan. 18, 1972

[54] AUTOMATIC CONTROL WITH ROOM AIR SAMPLING MEANS FOR WINDOW AIR CONDITIONER

[72] Inventor: Gene A. Heth, St. Joseph, Mich.
[73] Assignee: Whirlpool Corporation
[22] Filed: Nov. 3, 1969
[21] Appl. No.: 873,450

[52] U.S. Cl. ..................................62/157, 62/180, 62/207
[51] Int. Cl. ............................................F25d 17/00
[58] Field of Search..................62/157, 202, 207, 180, 181, 62/226

[56] References Cited

UNITED STATES PATENTS 3,174,297  3/1965  Kuhn .....................................62/202

Primary Examiner—Meyer Perlin
Attorney—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord

[57] ABSTRACT

An air conditioner control circuit having a thermostat for automatically causing the air conditioner to be deenergized at predetermined low temperatures and including a timing device causing the room air to be periodically delivered to the thermostat of the air conditioner for providing improved automatic thermostatic control of the air conditioner. The means for bringing the air to the thermostate may comprise an automatic timer for periodically energizing the fan of the air conditioner at temperatures below the predetermined low.

12 Claims, 3 Drawing Figures

PATENTED JAN 18 1972
3,635,044
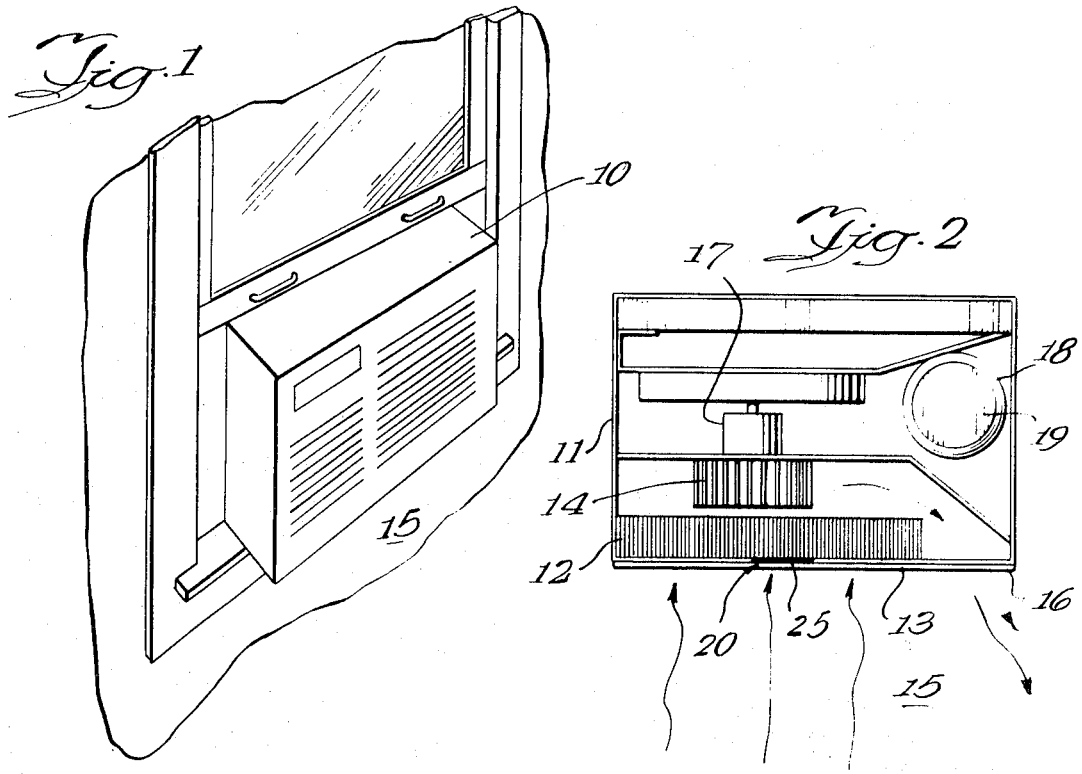
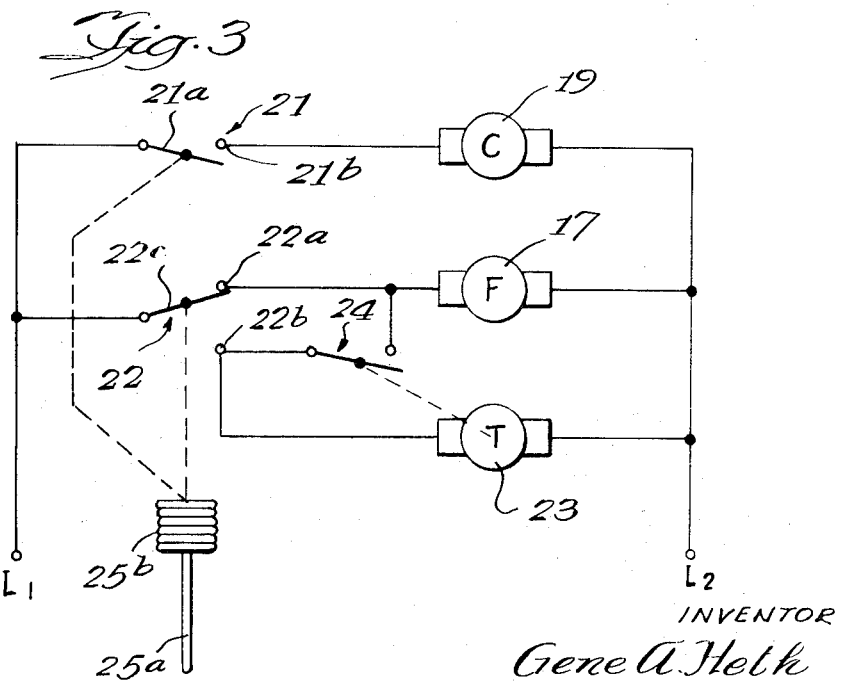
INVENTOR
Gene A. Heth
BY Hofgren, Wegner, Allen, Stellman & McCord
ATTORNEYS

AUTOMATIC CONTROL WITH ROOM AIR SAMPLING MEANS FOR WINDOW AIR CONDITIONER

BACKGROUND OF THE INVENTION

1. Field of the Invention

This invention relates to air conditioners and in particular to temperature responsive control circuit means therefor.

2. Description of the Prior Art

In one form of automatic air conditioner, a compressor is provided for compressing refrigerant vapor for delivery to a condenser where the vapor is liquified and thence to a suitable evaporator wherein evaporation of the liquid effects a desired cooling heat transfer with air flowed through the air conditioner by means of a suitable fan. Thermostatic control means may be provided for controlling the operation of the compressor motor and fan motor. Thus, a first switch may be provided for controlling the fan motor to energize the fan and cause circulation of room air through the air conditioner at a preselected low temperature. A second switch may be provided for controlling the compressor for energizing the compressor at a preselected higher temperature.

A problem arises in the use of such air conditioner apparatus in that when the compressor and fan motors are deenergized, room air is not circulated through the air conditioner and, thus, the temperature of the air closely adjacent the thermostatic sensing means may differ substantially from the temperature of the room air externally of the air conditioner. Thus, the average room temperature may rise substantially above the desired operating temperature of the air conditioner before the sensing means of the air conditioner is actuated to effect an air conditioning operation.

SUMMARY OF THE INVENTION

The present invention comprehends an improved automatic control for use with such air conditioners wherein means are provided for periodically delivering room air to adjacent the sensing means, thereby avoiding the disadvantages of the above discussed known air conditioner controls.

The control may include a timer motor and associated switch means which periodically operate the air conditioner fan to draw room air into the air conditioner and, thus, in heat transfer association with the thermostat means.

BRIEF DESCRIPTION OF THE DRAWING

Other features and advantages of the invention will be apparent from the following description taken in connection with the accompanying drawing wherein FIG. 1 is a perspective view of an air conditioner embodying the invention, mounted in a window portion of a conventional room wall;

FIG. 2 is a schematic horizontal section thereof; and

FIG. 3 is a schematic wiring diagram of the control circuit.

DESCRIPTION OF THE PREFERRED EMBODIMENT

In the exemplary embodiment of the invention as disclosed in the drawing, an air conditioner generally designated 10 is shown to comprise an enclosure 11 housing a conventional evaporator 12 behind a front grille 13. Air-circulating means, herein in the form of a blower 14, are provided for circulating air through the front grille 13 into heat transfer association with the evaporator 12. The refrigerated air may be returned to the room space 15 through an outlet grille portion 16. The blower 14 may be driven by a suitable electric motor 17. Refrigerant fluid is compressed by means of a suitable conventional compressor 18 driven by an electric motor 19 and delivered to the evaporator 12 for effecting the desired refrigeration of the circulated air. A two-state thermostat 20 may be mounted behind grille 13 within the enclosure 11 for sensing the temperature of the room air.

More specifically, thermostat 20 includes a first, single-pole, single-throw switch 21 connected in series with the compressor motor 19 and a second, single-pole, double-throw switch 22 having one fixed contact 22a connected in series with the blower motor 17 and a second fixed contact 22b connected in series with a timer motor 23. Timer motor 23 operates a single-pole, single-throw switch 24 connected in series with blower motor 17 and fixed contact 22b. Thus, each of the compressor motor 19, blower motor 17, and timer motor 23, are effectively connected in electrical parallel association between power supply leads $L_1$ and $L_2$ as shown in FIG. 3, under the control of the respective switches 21, 22, and 24.

Thermostat 20 includes a temperature-sensing means 25 which may comprise a conventional liquid or gas filled bulb 25a connected to a bellows element 25b adapted to throw movable contact 22c of switch 22 into engagement with fixed contact 22a at a first preselected low temperature. Sensing means 25 further causes movable contact 22c to be thrown from engagement with contact 22a into engagement with contact 22b at a second lower preselected low temperature. Movable contact 21a of switch 21 is caused to be thrown into engagement with fixed contact 21b at a third low temperature above the temperature at which the movable contact 22c is thrown into contact with fixed contact 22a and is caused to move away from fixed contact 21b at a fourth low temperature above the second low temperatures at which switch 22 is operated. Illustratively, the thermostat 20 may control the operation of compressor motor 19 and blower motor 17 such as to maintain the room air temperature at 70° F. by effecting a closure of switch contact 22c at 72° and an opening of the switch contact at 68° with a corresponding closing of switch contact 21a at 70° and an opening thereof at 66° where the thermostat comprises a conventional 4° differential thermostat. As is conventional, the thermostat may comprise an adjustable thermostat to permit the user to set the operating temperatures as desired for maintaining different room air temperatures.

Timer motor 23 suitably operates switch 24 to periodically close this switch at preselected intervals for a preselected period of time.

Thus, assuming that the air conditioner 10 has operated to reduce the temperature of the room space 15 to the lowermost preselected temperature of thermostat 20 comprising the above indicated second low temperature, the switch 21 is open and movable contact 22c of switch 22 in engagement with fixed contact 22b thereby opening the circuit through movable contact 22c and fixed contact 22a to blower motor 17. Resultingly, each of the compressor and blower motors is deenergized. However, the throwing of movable contact 22c into engagement with fixed contact 22b establishes a circuit to the timer motor 23 whereupon switch 24 is closed after a preselected time to energize blower motor 17. Thus, blower 14 is operated to draw room air from space 15 past the sensing means 25 for a preselected period of time, such as several minutes, to assure that the sensing means 25 senses the temperature of the room air. Where such intermittent air flow is not effected, it has been found that the temperature of the air immediately adjacent the sensing element 25 may vary appreciably from that of the room air temperature by virtue of the shielding action of the grille 13 and associated air filter (not shown). Thus, as a result of the intermittent circulation of room air past the sensing means 25, an improved sensing of the room air temperature is obtained whereby operation of the air conditioner in accordance with the room temperature conditions is provided.

When the temperature sensed by thermostat sensing means 25 rises to the first preselected low temperature, thermostat switch contact 22c is thrown from fixed contact 22b into engagement with fixed contact 22a thereby maintaining the circuit to the blower motor 17. When the temperature sensed by sensing means 25 further rises to the third preselected low temperature, contact 21a is brought into engagement with fixed contact 21b thereby initiating operation of the compressor.

Such concurrent operation of the compressor and blower continue until the room air is cooled sufficiently to lower the temperature of the air being drawn past the sensing means 25 to the above indicated fourth preselected low temperature whereupon contact 21a of switch 21 moves away from fixed contact 22b thereby discontinuing operation of compressor motor 19. Operation of blower motor 17, however, is maintained until the temperature of the air sensed by means 25 drops further to the above indicated second preselected low temperature thereby to move switch contact 22c from fixed contact 22a and back to engagement with fixed contact 22b thereby terminating operation of the blower and reestablishing intermittent operation of switch 24 by timer motor 23.

If, during the intermittent operation of blower motor 17 by the closing of switch 24, the temperature sensed by means 25 is below the preselected first low temperature, the timer motor merely reopens switch 24 permitting the air conditioner to remain in the "Off" condition. However, such intermittent operation of the blower may be continued until such time as the temperature sensed by means 25 reaches the indicated first low temperature whereupon the above discussed cycle of operation is again commenced.

While the invention has been described in connection with the utilization of a single-sensing element for switches 21 and 22, as will be obvious to those skilled in the art, any suitable thermostat sensing means may be provided including individual sensing elements for each of the switches.

The foregoing disclosure of specific embodiments is illustrative of the broad inventive concepts comprehended by the invention.

I claim:

1. An air conditioner comprising: means for conditioning air; air-circulating means for circulating ambient air in association with said conditioning means to be conditioned thereby; control means for sensing the condition of the air to be conditioned for controlling the operation of said conditioning means and said air-circulating means, said control means including a thermostat switch for terminating operation of said air-circulating means as a result of the temperature of air in heat transfer association with said sensing means being below a preselected temperature; and means for periodically operating said air-circulating means to sample the ambient air by bringing ambient air to control means periodically for sensing the condition thereof notwithstanding the temperature of air in heat transfer association with said thermostat switch being below said preselected temperature.

2. The air conditioner of claim 1 wherein said conditioning means comprises air-refrigerating means.

3. The air conditioner of claim 1 wherein said means for periodically operating said air-circulating means is connected in parallel with said thermostat switch to operate said air-circulating means.

4. The air conditioner of claim 1 wherein said means for periodically operating said air-circulating means comprises a motor driven timer.

5. The air conditioner of claim 1 wherein said control means include a first thermally responsive switch means for controlling the operation of said conditioning means, and a second thermally responsive switch means for controlling the operation of said air-circulating means.

6. The air conditioner of claim 5 wherein said means for periodically operating said air-circulating means comprises a timer motor, said second thermally responsive switch means concurrently energizing said timer motor and deenergizing the air-circulating means, and means responsive to a preselected time of operation of said timer motor for energizing said air-circulating means.

7. The air conditioner of claim 1 wherein said control means is arranged to operate said air-circulating means independently of said means for periodically operating said air-circulating means.

8. An air conditioner comprising: a compressor; a condenser; an evaporator; air-circulating means for circulating air in heat transfer relationship with said condenser and said evaporator and from the evaporator to an enclosure; means for selectively energizing said compressor and air-circulating means; thermally responsive means for deenergizing said compressor at a first preselected temperature and deenergizing said air-circulating means at a second preselected temperature below said first preselected temperature; and control means for sampling ambient air periodically including means for energizing said air circulating means periodically notwithstanding the temperature being sensed by said thermally responsive means being below said second preselected temperature.

9. The air conditioner of claim 8 wherein said control means includes a timer means.

10. The air conditioner of claim 9 wherein said control means is controlled by said thermally responsive means.

11. The air conditioner of claim 8 wherein said thermally responsive means includes a first thermostat switch for controlling operation of the compressor and a second thermostat switch for controlling operation of the air circulating means.

12. The air conditioner of claim 11 wherein said second thermostat switch controls operation of said control means.

* * * * *